United States Patent

Tchobanoglous

[11] 3,959,124
[45] May 25, 1976

[54] METHOD AND APPARATUS FOR THE ACTIVATED SLUDGE TREATMENT OF WASTEWATER

[75] Inventor: George Tchobanoglous, Davis, Calif.

[73] Assignee: SWECO, Inc., Los Angeles, Calif.

[22] Filed: Apr. 18, 1975

[21] Appl. No.: 569,267

Related U.S. Application Data

[63] Continuation-in-part of Ser. No. 488,816, July 15, 1974, abandoned.

[52] U.S. Cl. ........................................ 210/6; 210/7; 210/9; 210/73 S; 210/76; 210/77; 210/195 S; 210/297
[51] Int. Cl.² ........................................ C02C 1/22
[58] Field of Search .................. 210/3–10, 210/73 SG, 76, 77, 78, 174, 194, 195 AM, 195 O, 252, 254, 297, 377, 380, 393

[56] References Cited
UNITED STATES PATENTS

| | | | |
|---|---|---|---|
| 2,158,080 | 5/1939 | Montgomery et al. | 210/195 X |
| 3,579,439 | 5/1971 | Meiring et al. | 210/5 |
| 3,627,130 | 12/1971 | Talley, Jr. et al. | 210/78 |
| 3,769,204 | 10/1973 | Kincannon et al. | 210/6 |
| 3,868,087 | 2/1975 | Talley, Jr. | 210/377 |

OTHER PUBLICATIONS

Journal Water Pollution Control, May, 1974, Vol. 46, No. 5, p. 973.

*Primary Examiner*—Thomas G. Wyse
*Assistant Examiner*—Robert G. Mukai
*Attorney, Agent, or Firm*—Lyon & Lyon

[57] ABSTRACT

An activated sludge treatment method and apparatus for the processing of sewage and other wastewater wherein a screening system is employed in combination with an aeration basin and a secondary clarifier. The screening device here employed is positioned to receive all or a part of the flow from the aeration basin for the removal of solids from this flow. The screened effluent is then directed to the secondary clarifier for the settling of remaining particles. The concentrate may be returned to the aeration basin as activated sludge or removed from the system as a means for controlling the amount of solids in the treatment system. The screening device includes a rotating screen structure having a distribution system located within the screen structure for distributing effluent from the aeration basin to the inner surfaces of the screens. Effluent passing through the screens is collected and directed to the secondary clarifier. Solids screened from the effluent move downwardly on the rotating screens and are collected as a concentrate. The system increases the overall capacity of the treatment facility, reduces the problems associated with the presence of filamentous organisms and allows substantial control over the process.

22 Claims, 11 Drawing Figures

FIG_3

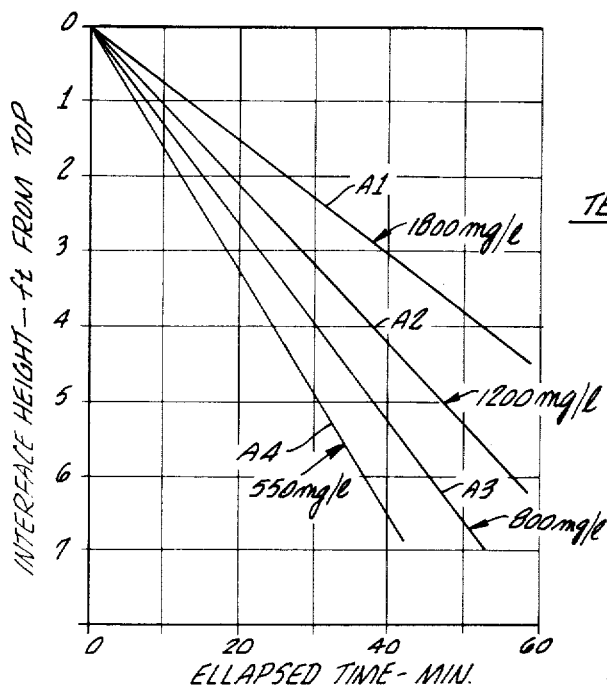
FIG.9 TEST A
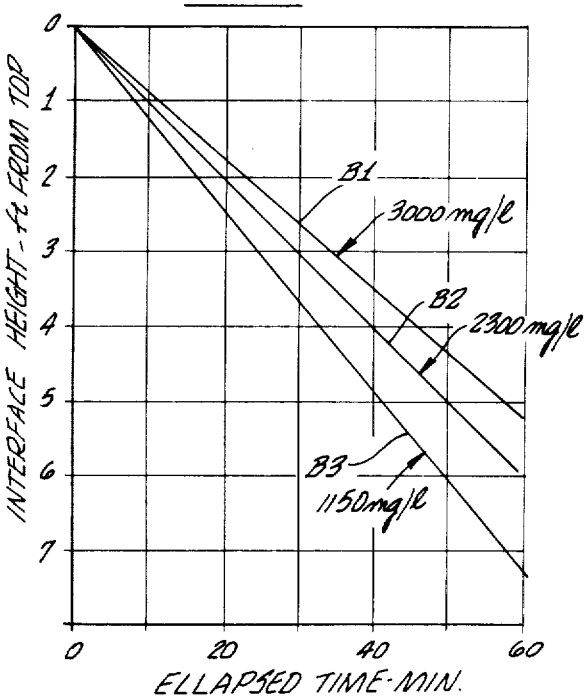
FIG.10 TEST B
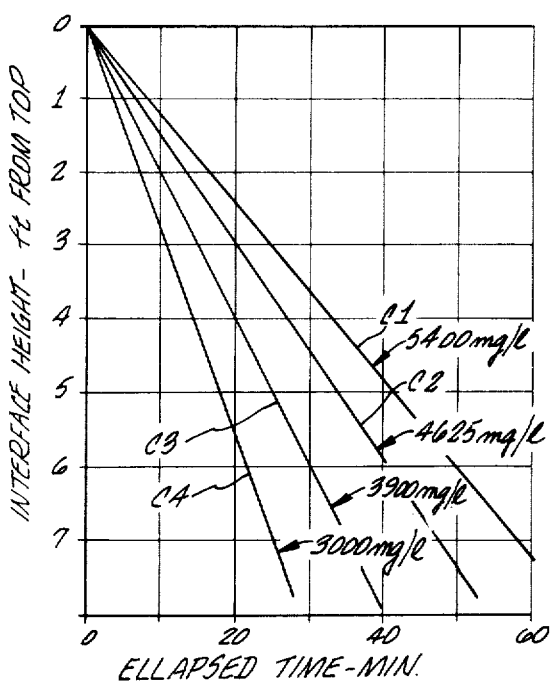
TEST C FIG.11

METHOD AND APPARATUS FOR THE ACTIVATED SLUDGE TREATMENT OF WASTEWATER

This is a continuation-in-part of the application Ser. No. 488,816, filed July 15, 1974, now abandoned.

This invention is directed to a method and apparatus for the processing of domestic and industrial wastewater using an activated sludge treatment. More specifically, the present invention is directed to a method and apparatus whereby screening of all or a part of the flow from an aeration basin is performed before this flow is directed to a secondary clarifier.

Conventional activated sludge treatment facilities for the treatment of sewage and other wastewater generally employ a primary clarifier for removing settleable solids from the influent wastewater, an aeration basin for the bacterial conversion of the organic material in the wastewater to cell material and a secondary clarifier for the settling of the cell material produced in the aeration basin. The primary clarifier provides for the removal of settleable solids. The output from the primary clarifier still contains non-settleable suspended and dissolved organic matter. The effluent from the primary clarifier is directed to the aeration basin where it is aerated in order that substantial amounts of oxygen may be mixed with the wastewater. This aerobic environment allows aerobic organisms to grow and consume the organic material contained within the incoming wastewater from the primary clarifier. As this process goes on continuously, the new cells produced from the organic material must be removed to maintain proper operation of the process. To do this, cell material is passed to a secondary clarifier where the cell material is settled. Effluent from the secondary clarifier is then chlorinated and directed from the system. The sludge forming the sediment in the seconary clarifier generally includes the organisms employed within the aeration basin. However, these organisms have now been converted to an anaerobic state because the sludge has remained in the secondary clarifier as it settles. This sludge is referred to as settled activated sludge and is returned after several hours in the secondary clarifier to the aeration basin for continuing the organic process on fresh wastewater provided to the aeration basin. In order that the bacteria will perform the desired process, it is again subjected to aeration. Thus, the organisms are reconverted to an aerobic state and the process continues. Because the primary clarifier relies extensively on the settling properties of the constituents of the incoming wastewater, most of the organic material is not removed as it is present in the dissolved and colloidal state. Consequently, substantial variations in the amounts and types of organic materials directd to the aeration basin will occur with variations in the quality and amount of influent to the primary clarifier. Likewise, the conditions existing within the aeration basin and the effluent resulting therefrom are greatly independent on the quantity, concentration and nature of the influent thereto. Such variations in the conditions within the aeration basin do not seriously affect the process therein. However, the settling properties of the aeration basin effluent, highly affected by the type of organic material and the concentration of solids, greatly affects the capacity and operation of the secondary clarifier. Consequently, control must be maintained over the aeration basin to prevent failure of the secondary clarifier.

To control the activated sludge process, the new sludge produced each day must be removed therefrom. This sludge is substantially diluted with water and consequently must be withdrawn in large quantities. This removal of sludge from the aeration basin with the subsequent introduction of more diluted wastewater effects some control over the process. However, the control is generally not sufficient to provide a uniform effluent to the secondary clarifier. It is not uncommon for the secondary clarifier to exceed its maximum capacity under such conditions and thus discharge solids from the treatment facility. Further, many treatment facilities are now run at maximum or greater than maximum capacity. As a result, many systems now continuously discharge excess solids from the secondary treatment facility.

Control over the quality of the effluent from the aeration basin is also difficult. Under certain conditions believed to result from the lack of sufficient trace elements necessary to support the growth of conventional organisms the growth of filamentous organisms is experienced. Filamentous organisms grow in long filaments which acquire a density in mass approximately equal to the density of water. Further, these organisms become entangled and form a sponge-like system. These various characteristics of filamentous growth prevent the proper settling of the solids in the secondary clarifier. Consequently, the secondary clarifier quickly becomes filled with solids and solids are released in the effluent from the system. Release of sludge from the aeration basin does not affect the nature of the growth. Consequently, expensive and somewhat ineffective chemical treatment is quite often employed in such instances. Thus, control over conventional activated sludge wastewater treatment facilities is generally hard to accomplish. Further, as the Environmental Protection Agency of the Federal Government increases the requirements for quality of treatment facility effluent and the amount of wastewater generated continues to increase, treatment facilities are becoming overloaded and new facilities must be installed in an attempt to comply with these new standards. Thus, the existing need for greater control capability and overall efficiency in present facilities and in new projects has become more acute because of government requirements.

Some work has been done in the use of screening devices for employment in activated sludge treatment systems. However, these efforts have been directed to the use of screens as a replacement for the secondary clarifier. Substantial difficulty is encountered in such use because of the quantities of liquid which must be processed, the nature of the sludge and the requirement for very fine screening capacity. The sludge is generally very slimy and easily blinds screening elements. It is also difficult to clean from screening elements. Such systems are not feasible in this application from a practical standpoint because of the complexity, cost and lack of reliability associated with such screening systems.

The present invention has been developed as a means for greatly improving the control and capacity of wastewater treatment facilities employing an activated sludge process. It has been found that the aeration process, the settling rate in the secondary clarifier and overall control of the process can be substantially enhanced by means of the present invention. Further, the difficulties normally associated with previous use of screens in an activated sludge system are circumvented. The present invention is directed to both method and apparatus for screening at least a portion of the flow from the aeration basin to reduce and control the amount of solids directed to the secondary clarifier. The concentrate derived from the screening is also employed as activated sludge through its return to the aeration basin. This concentrate may instead be withdrawn to control the amount of solids present within the entire system or the aeration basin. Through this screening operation, the control and effectiveness of the entire system is substantially improved. Further, the problems associated with filamentous organisms can also be significantly controlled.

The screening device found to be most useful in the present application is a centrifugal screening device having a screen structure which is rotatably mounted on a frame. The flow from the aeration basin is fed to the inner surface of the rotating screen structure. The effluent from the screen structure is directed to the secondary clarifier. The concentrate from the screen structure is fed back to the aeration basin or is removed as a means for wasting solids. It has even been found that substantial improvement results from partial removal of the solids from the aeration basin flow. Thus, it is not necessary that the separator provide a complete screening of this flow. As a result, coarser screens may be employed in order that more wastewater may be treated. Alternately, a portion of the flow may be screened more completely using a finer screen. In either instance, the amount of solids extracted may be the same. The present screening device includes a separate back spray and a washing action created by the influent to the device which act to control buildup and blinding from the slimy, hard to process sludge.

The advantages in system control provided by the present invention result from the ability to control the concentrate and from the nature of the screening structure which reduces the amount of solids directed to the secondary clarifier. At the same time, the quantity of solids in the aeration basin may be maintained to an optimum level.

The screening structure is also operated to increase the overall capacity of such systems by removing a portion of the total amount of solids which would otherwise be directed to the secondary clarifier. It has long been known that the relationship between settling velocity and the concentration of solids in the secondary clarifier may be characterized by an inverse exponential function. The settling velocity of the wastewater sludge depends upon the concentration of solids in the wastewater according to the formula $V_i = aC-n$ where "$V_i$" is the velocity of the interface, $C$ is the concentration and $a$ and $n$ are constants which must be emperically determined at each treatment plant. This relationship applies when the concentration of solids directed to the secondary clarifier is above the designed capacity of the plant. When such a condition exists, the particles making up the concentration in the seconary clarifier interfere with one another. Consequently, the settling velocity of the overall solids concentration is reduced.

When the treatment facility is operating within its designed capacity, the solids loading to the secondary clarifier is reduced to a point where the particles making up the solids concentration do not significantly interfere with one another. When such interference is substantially eliminated, the settling velocity is no longer related to the concentration by the emperical, inverse exponential function. Rather, the settling velocity is determined by such consideration as the density, drag and weight of the individual particles comprising the concentration of solids in the secondary clarifier. When this condition is realized, the secondary clarifier may be run at its hydraulic capacity. Thus, the reduction in solids concentration by screening before the secondary clarifier allows an overloaded facility to run at its hydraulic capacity and a new plant to be designed with a smaller and less expensive secondary clarifier.

When the solids loading to the secondary clarifier is reduced to a point where the secondary clarifier can operate at its hydraulic capacity, further reductions in the solids concentration is of little benefit. The solids which remain in the influent to the secondary clarifier will require substantially the same settling time regardless of the concentration unless the concentration reaches a level where particle interference occurs. Therefore, screening is necessary only to the extent that the hydraulic capacity of the secondary clarifier may be reached. At such point, the secondary clarifier may operate to settle sufficient solids to reduce the effluent from the system to an acceptable range, i.e. around 15 to 25 mg/liter suspended solids. This level of screening is based on entirely different considerations than the level of screening necessary to eliminate the secondary clarifier. In screening to totally eliminate the secondary clarifier, the suspended solids in the effluent from the screen must be reduced to around 15 to 25 mg/liter to obtain flow from the system of quality. Although efforts to eliminate the secondary settling having been made; these efforts have met insurmountable difficulties from the standpoint of effecting a practical system for sewage treatment. The degree of screening required and the nature of the material being screened make such a system unworkable for the domestic and industrial sewage treatment. On the other hand, such complete screening is not necessary in the present system, wherein a reduction in solids loading to the secondary clarifier is only of benefit to a level of concentration of a magnitude of $10^3$ mg/liter suspended solids at which point the designed hydraulic capacity of the secondary clarifier can normally be approached.

The present system also allows exceptional control over the mean cell residence time. During any 24 hour period as well as over longer periods of time, the total flow, the amount of organic material and the nature of the organic material flowing into a wastewater treatment facility will vary greatly. In conventional systems, the incoming wastewater must be continually moved through the system in order that excessive concentrations of solids will not be directed to the secondary clarifier. This can result in an inadequate mean cell residence time for the facility. However, with the present system, it is possible to control the concentration of solids directed to the secondary clarifier by means of the screening structure. Consequently, a greater solids concentration may be maintained in the aeration basin to allow a proper mean cell residence time without resulting in an overloading of the secondary clarifier. Because the concentrate from the screening structure may be fed back into the aeration basin, the flow of liquid from the aeration basin may be maintained at the hydraulic capacity of the secondary clarifier without losing the level of solids in the aeration basin.

Another advantageous feature of the present invention is that the concentrate from the screening device can be delivered back to the aeration basin within minutes of the time when the flow left the aeration basin. As mentioned above, the normal return of activated sludge from the secondary clarifier requires several hours of settling time. The speed with which the present system returns activated sludge is believed to prevent its transformation to anaerobic conditions. Consequently, the sludge is immediately ready to commence the organic aeration process. Ths is believed to enhance the operation of the treatment facility.

When the screening device is employed to separate solids from the entire effluent of the aeration basin, it provides a solution to a problem which continually plagues activated sludge treatment facilities. This screening system is capable of screening substantial amounts of filamentous organisms from the aeration basin flow. The effect of the screen on this filamentous material is to either extract the organisms as concentrate or break up and separate the organisms which pass in the screening effluent to the secondary clarifier. Thus, the secondary clarifier maintains a normal settling rate in spite of the presence of filamentous organisms in the aeration basin. Because the filamentous organisms are believed to consume organic materials at an equivalent or faster rate than normal activated sludge organisms, it may even be advantageous to operate with filamentous organisms in the aeration basin when the present invention is employed.

Accordingly, it is an object of the present invention to provide a system for an activated sludge treatment facility including method and apparatus which increases the capability of the facility.

It is another object of the present invention to provide method and apparatus for effecting greater control over an activated sludge treatment facility.

It is a further object of the present invention to minimize the settling problems associated with filamentous organisms.

Further objects and advantages of the present invention will become readily apparent from the following detailed description and accompanying drawings.

FIG. 9 is a graph illustrating elapsed time in minutes versus the interface height for settling sludge using Test A wastewater measured in feet from the top of the wastewater.

FIG. 10 is a graph illustrating elasped time in minutes versus the interface height for settling sludge using Test B wastewater measured in feet from the top of the wastewater.

FIG. 11 is a graph illustrating elapsed time in minutes versus the interface height for settling sludge using Test C wastewater measured in feet from the top of the wastewater.

Figure 1:
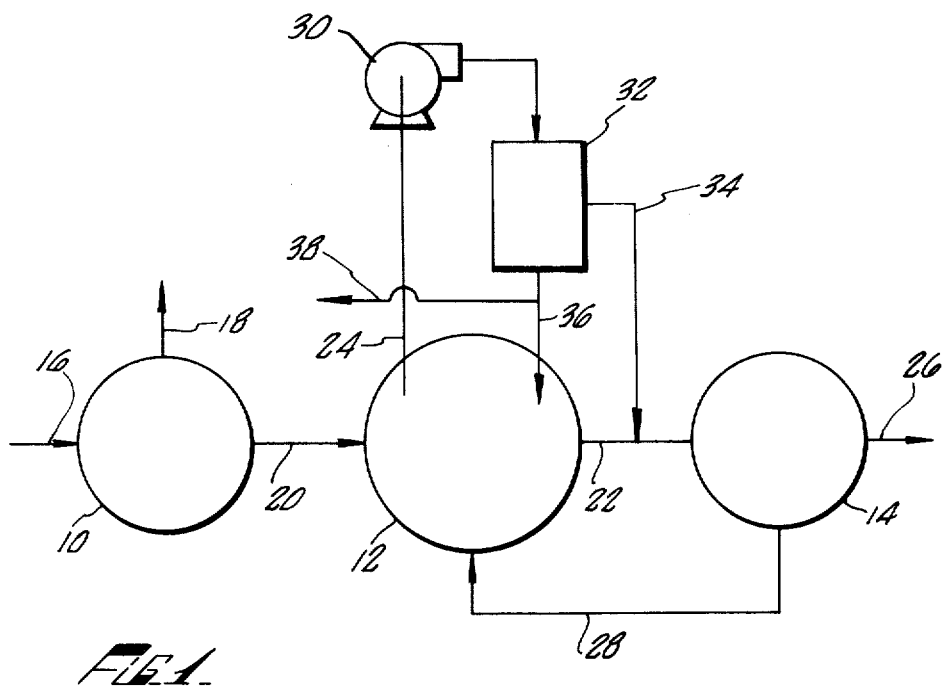
FIG. 1 is a schematic illustration of an activated sludge wastewater treatment facility employing the present invention.
Figure 2:
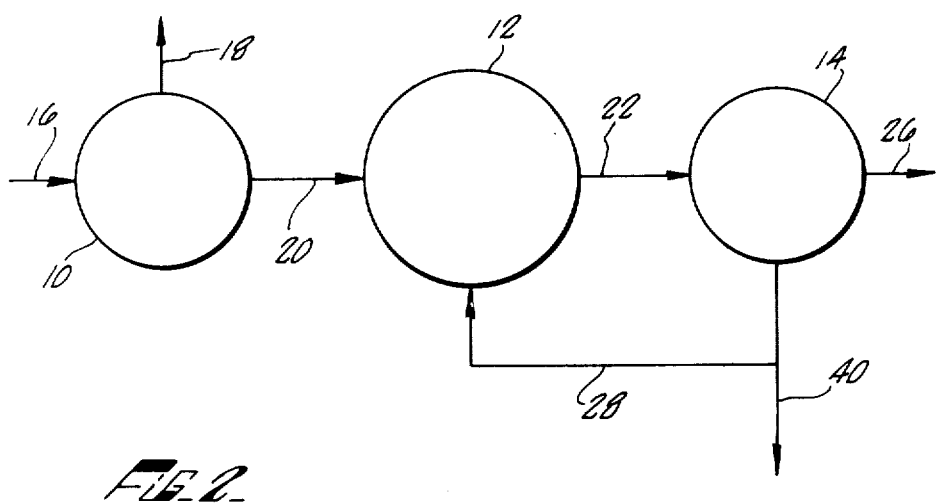
FIG. 2 is a schematic illustration of a conventional activated sludge wastewater treatment facility.

Turning in detail to FIG. 1, a schematic illustration of the present system is set forth. This may be compared with a schematic illustration of the conventional activated sludge treatment system illustrated in FIG. 2. In each instance, there is provided a primary clarifier 10, an aeration bash 12, and a secondary clarifier 14. Also common to the present invention and the conventional system is a return of the sludge from the secondary clarifier to the aeration basin. However, this sludge return is for different control purposes. Turning specifically to the present invention, the primary clarifier 10 receives influent at inlet 16. This influent typically encounters bar racks for a preliminary screening of the wastewater and a grit chamber for removal of grit in a sewage treatment facility. In the primary clarifier 10, settleable solids are allowed to settle and are conventionally removed at outlet 18. The wastewater still contains dissolved and non-settleable suspended organic matter and is directed to the aeration basin 12 through a conventional conduit 20. The aeration basin employs conventional aerators for mixing air with the wastewater contained within the aeration basin 12. This aeration of the wastewater results in rapid growth of aerobic organisms which proceed to consume the dissolved and suspended organic matter contained in the wastewater. This process is continuous and results in the production of new cells. Because the inflow into the aeration basin is continuous, cells are discharged from the aeration basin to a secondary settling tank.

Two paths 22 and 24 may be provided from the aeration basin 12. The first path 22 directs effluent from the aeration basin 12 to the secondary clarifier 14. This is the conventional path. The effluent from the aeration basin passing through effluent path 22 to the secondary clarifier 14 contains suspended solids which are the product of the organic process in the aeration basin. These solids are allowed to settle in the secondary clarifier 14. The liquid which has been separated from the solids is then drawn from the system through path 26 where it may be chlorinated in a chlorine contact chamber and released. The sludge (settled solids) in the secondary clarifier is then withdrawn by conventional means from the secondary clarifier, and returned through path 28 to the aeration basin. This sludge is referred to as return sludge. The passage of the sludge from the aeration basin to the secondary clarifier, its sedimentation and subsequent return via the return path 28 requires several hours. As a result of this delay, the returned sludge includes organisms which have been converted to an anaerobic state. This anaerobic state is not useful in the aeration process and consequently, the organisms must be given time to reconvert to an aerobic state before the organic reaction can take place within the aeration basin.

In a conventional activated sludge treatment facility, all of the effluent from the aeration basin 12 passes through the effluent path 22 to the secondary clarifier 14. Thus, the secondary clarifier must receive and process all solids generated in the system. As the demand on such treatment facilities increases, it is normally the secondary clarifier which reduces full capacity first. When more wastewater must be processed than can be handled by the secondary clarifier, solids will be discharged along path 26. This will result in the contamination of the discharge waterway receiving the treatment facility effluent. This overloading of the secondary clarifier 14 may be brought about by a quantity of wastewater and solids which simply exceeds the designed capability of the system. On the other hand, failure of the secondary clarifier may result when the nature of the sludge is such that it requires substantially more time in settling out of the wastewater. Such is true when filamentous organisms, which are comprised of long entangled filaments and which have a specific gravity near that of water, are present. These characteristics cause the filamentous sludge to settle very slowly if at all. Failure may also result in the secondary clarifier when a substantial increase in the percentage of sludge in the wastewater occurs even for a short period of time. In such an event, the system must be quickly regulated to allow longer retention time of the wastewater within the secondary clarifier. If the system is running near capacity, greater retention may not be feasible. Thus, several factors may operate either independently or together to bring about a failure of the secondary clarifier 14 in a conventional treatment facility. The ability to control such occurences as filamentous growth and fluctuations in the influent concentration in conventional systems is to a great extent lacking.

As shown in FIG. 1, a second path 24 is provided from the aeration basin in the present invention. This second path 24 may originate in the aeration basin 12 as schematically shown in FIG. 1 or it may tap aeration basin effluent directly from effluent path 22. In either case, the path 24 allows a portion or all of the flow from the aeration basin to be directed to a screening device rather than passing directly to the secondary clarifier through effluent path 22. The path 24 leads to a pump 30. The pump 30 is illustrated in path 24; however, the relative vertical orientation of the several components involved in such a treatment facility may require the pump to be located on one of the other paths through which wastewater and sludge flow. The pump 30 then discharges to a screening means 32 for removal of at least a portion of the sludge contained within the flow from the aeration basin 12. The present embodiment incorporates a screening means 32 which is a centrifugal wastewater concentrator as will be fully disclosed hereinafter.

The products from the screening means 32 include a screened effluent directed through passageway 34 to the secondary clarifier and a concentrate directed through passageway 36 back into the aeration basin 12. The effluent from the screening means 32 has a substantial amount of solids removed therefrom. Consequently, the combined flow to the secondary clarifier 14 has fewer solids which require settling. The amount of flow treated by the screening means 32 relative to the amount of untreated effluent from the aeration basin will depend on the treatment requirements necessary to optimize the operation of the secondary clarifier. It has bee found that any removal of solids from the influent to the secondary clarifier 14 advantageously benefits the operation of the secondary clarifier 14 in bringing it up to its hydraulic capacity. Consequently, the use of the screening means 32 has a beneficial effect regardless of its overall capability in relationship to the size of the treatment facility. The necessary reduction in solids to the secondary clarifier 14 may be accomplished through a comprehensive screening of a portion of the flow from the aeration basin or by a light screening of the entire flow from the aeration basin. Consequently, a variety of mesh sizes for the screening means 32 and a variation in the number and capability of the screening means regardless of mesh size must be considered.

Where filamentous growth is a problem, it may be that a light screening of the entire quantity of flow from the aeration basin 12 is more advantageous than a heavier screening of a portion of the flow from the aeration basin 12 which would otherwise result in the same quantity of solids removal. The filamentous material appears to be more easily screened and a coarser screen mesh may be possible. The sponge like characteristics of the entangled filamentous sludge are believed to be substantially eliminated through the breaking up of this entangled mass by the passage of this material through the screens. Thus, the second effluent settling characteristics may be improved by the screening action as well as by the removal of a quantity of solids to reduce the solids concentration.

Another advantage to screening the entire flow from the aeration basin 12 is that the concentration of solids which is distributed to the secondary clarifier 14 may be controlled. The screening means here employed tends to allow a constant concentration to be carrier by the effluent from the screening means 32 to the secondary clarifier 14 independent of the amount of solids distributed to the screening means 32 from the aeration basin 12. Thus, moderate increases or decreases in the amount of solids within the aeration basin 12 will have far less effect on the conditions within the secondary clarifier 14 when a screening means 32 is employed to screen all of the effluent from the aeration basin 12. In order that a specific system may be established for a given treatment facility, it is necessary to consider the relationship in the concentration of solids to the settling velocity, the type of growth encountered in the aeration basin, the overall quantity of wastewater being treated, the capacity of the treatment plant, and other pertinent factors such as the cost of each system both in capital outlay and maintenance.

In treatment facilities not plagued with filamentous growth, the absolute reduction in the percentage of solids in the secondary clarifier provides an improved settling of the sludge. Consequently, in a situation where filamentous growth growth is not a problem, the screening of a portion of the flow from the aeration basin with a fine screen will result in the same settling rate in the secondary clarifier 14 as a screening of the entire flow with a coarse screen with equal solids removal.

The concentrate from the screening means 32 is directed through passageway 36 back into the aeration basin 12. It is believed that the aeration basin reaches a greater capacity when at a higher solids concentration level than is possible in a conventional system. The proper operation of the secondary clarifier 14 in the majority of conventional treatment facilities has heretofore dictated the maximum concentration level which could be maintained in the aeration basin. Because the flow from the aeration basin is screened by the screening means 32 to reduce the solids concentration to the secondary clarifier in the present invention, a higher level of solids may be maintained within the aeration basin 12. Thus, the concentrate may be introduced back into the aeration basin 12 to raise the level of solids concentration therein. Additional oxygen may be required with such an increase in concentration. Further, only minutes are required for removing wastewater through path 24, screening the wastewater by means of the screening means 32 and returning the concentrate through passageway 36 to the aeration basin. The organisms present within the wastewater which pass through the screening means 32 do not have the opportunity to fully convert to an anaerobic state. The time away from the aeration basin is too short for complete transformation and the screening means 32 acts much like an aerator which acts to keep the organisms in an environment wherein oxygen is present. Consequently, little or no time is required for the conversion of the activated sludge introduced as concentrate from the screening means 32 back into an aerobic state for the proper organic reaction within the aeration basin.

The concentrate from the screening means 32 may also be wasted from the treatment facility through exhaust passageway 38. In this way, the level of solids within the aeration basin 12 may be carefully controlled to maintain an optimum concentration of sludge. As all of the sludge flowing from the aeration basin is either returned from the secondary clarifier through the return path 28 or as concentrate from the screening means 32, there will occur a buildup in the aeration basin of solids resulting from the continuous introduction of dissolved and suspended organic matter from the primary clarifier 10. Thus, it is advantageous to remove through exhaust passageway 38 an amount of solids equal to the net solids produced each day. In the conventional system, these solids are removed through drain 40 rather than exhaust passageway 38 is in the present system. This wasting of solids through tapping of concentrate from the screening means 32 provides greater control over the quantities of solids within the various portions of the facility and also allows the wasting of solids in a more advantageous form. The solids extracted from the secondary clarifier in a conventional system include substantial wastewater because of the inability of the secondary clarifier 14 to separate effectively the wastewater therefrom. However, the screening means 32 releases the solids as a concentrate having less water therein. Because of reduced fluid volume, the concentrate is easier to handle.

Thus, the screening means 32 provides overall control of an activated sludge treatment facility not otherwise available. The screening means 32 makes more uniform the effluent discharged to the secondary clarifier because of its tendency to allow a relatively constant concentration of solids to pass with the effluent into the secondary clarifier and because of its ability to break up filamentous growth. The screening means 32 also allows control of the quantity of solids within the aeration basin through the selected discharge of the concentrate either back into the aeration basin or away from the system. The wasting of material through the screening means 32 also maintains the appropriate overall solids content in the facility.

Along with control, the overall capacity of the system may be increased through the reduction in the total number of solids directed to the secondary clarifier 14. This reduction in solids to the secondary clarifier allows a substantial settling velocity increase for the remaining solids in the wastewater in the secondary clarifier. Also, the aeration basin may increase in capacity through the control of an optimum level of solids therein. Thus, both the aeration basin and the secondary clarifier may be improved to give greater capacity to the entire facility through the use of the present invention.

It has been the intent of those working with screening systems for wastewater treatment that one or more of the components within the wastewater treatment facilities be replaced with such screening systems. However, in the present invention, it is the advantageous use of a screening system in combination with the aeration basin and the secondary clarifier which improves the operation of these conventional components rather than acts to replace them. Because the secondary clarifier tends to be the most critical component in the overall treatment facility, the improvement of the operation of the secondary clarifier improves the overall capability of the system. It is also here suggested that the growth of filamentous organisms within the aeration basin need not be considered a problem. The presence of this growth has heretofore been considered a liability in such an activated sludge facility because no control could be obtained over the discharge of this growth to the secondary clarifier. The overall capability of the aeration basin is also increased through the use of fresh activated sludge immediately diverted by the screening means 32 back into the aeration basin for initiating further reactions therein. It can therefore be concluded that the present invention provides substantially increased control over the operation of the facility and further increases the capacity of the treatment facilities.

Figure 3:
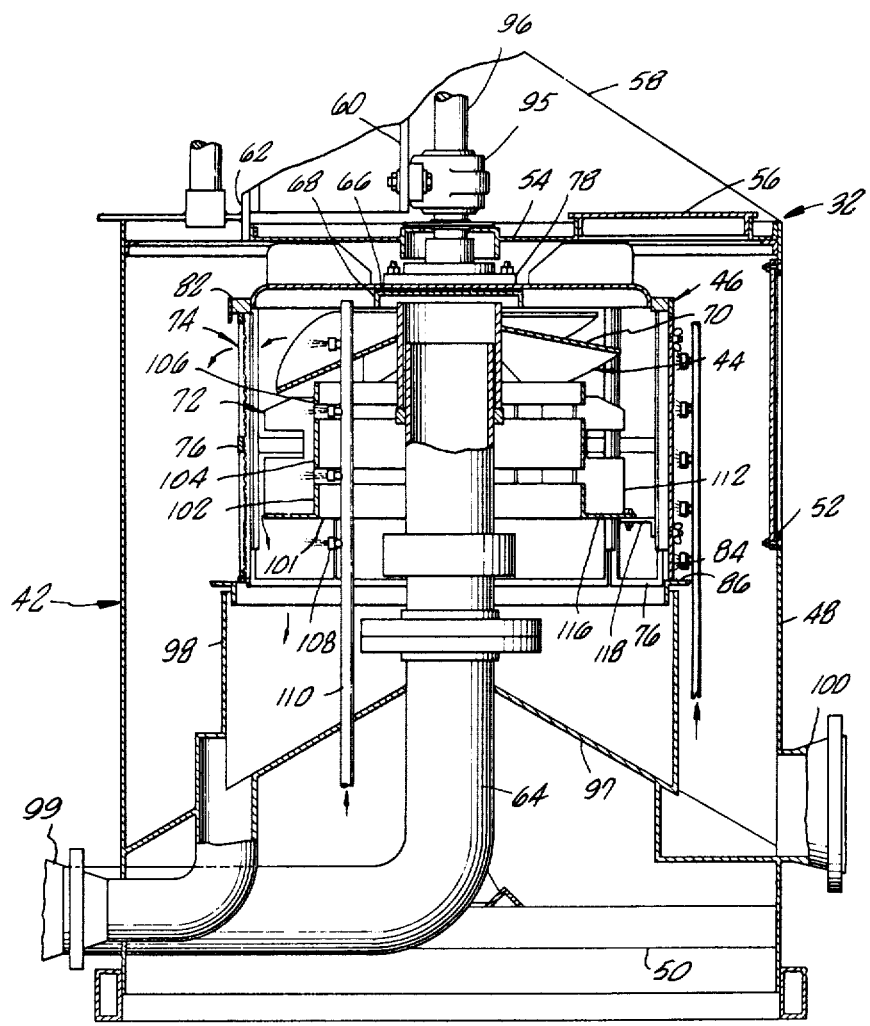
FIG. 3 is a side view of a preferred screening device employed with the present invention.
Figure 4:
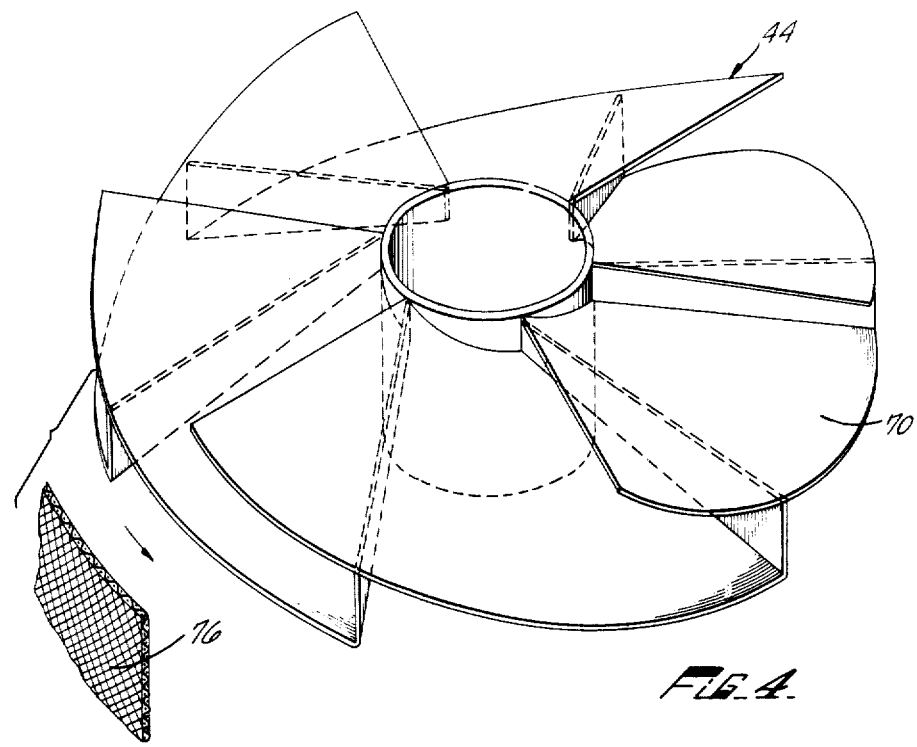
FIG. 4 is a perspective view of the distribution system associated with the screening device.
Figure 5:
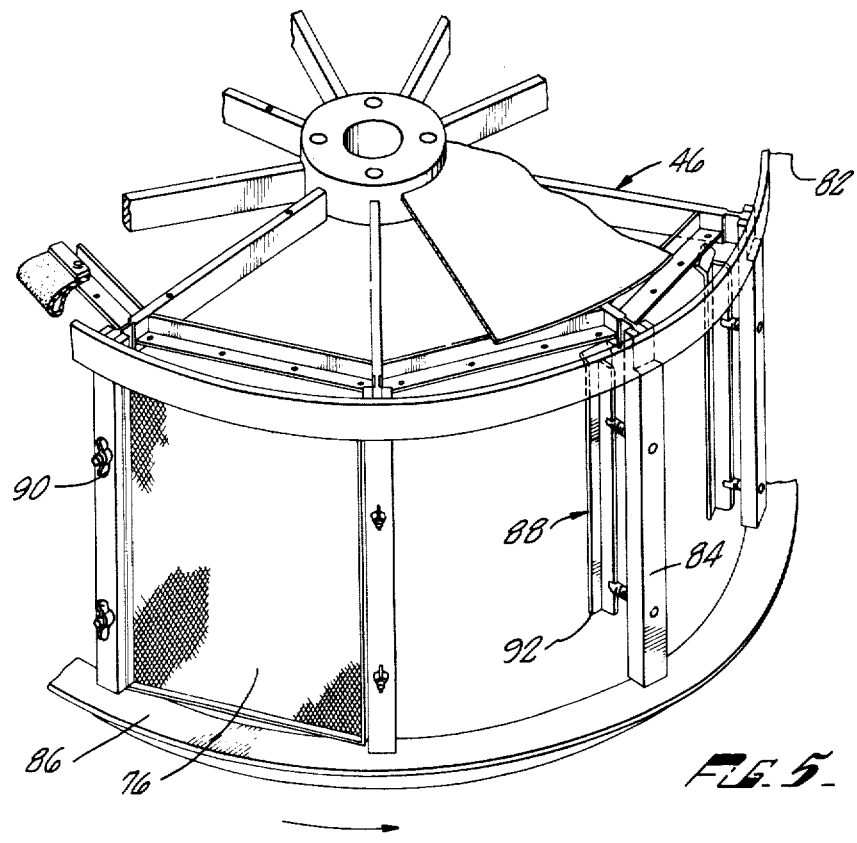
FIG. 5 is a fragmentary perspective view of a substantially cylindrical screening structure.

Turning to the screening means 32, as seen in FIGS. 3 through 5, there is disclosed a centrifugal wastewater concentrator generally including a base 42, a distribution means 44 and a substantially cylindrical rotating screen structure 46. The present device, including useful variations thereof, is fully disclosed in the following U.S. Pat. Nos.: McKibben, U.S. Pat. No. 3,539,008; McKibben, U.S. Pat. No. 3,511,373; Talley, Jr., et al., U.S. Pat. No. 3,627,130; Talley, Jr., U.S. Pat. No. 3,707,235; Westfall, U.S. Pat. No. 3,737,038; Mook, U.S. Pat. No. 3,743,094; Talley, Jr., U.S. Pat. No. 3,727,768; Mook, U.S. Pat. No. 3,775,311; Miller, U.S. Pat. No. 3,739,912; Talley, Jr., U.S. Pat. No. 3,868,087, Distributor For a Centrifugal Screen Separator. The following application also applies: Mook, Ser. No. 352,122, filed Apr. 13, 1973, now abandoned. In view of the foregoing patents and applications, assigned to the assignee of the present invention, the disclosures of which are incorporated herein by reference, only sufficient detail of the screening means 32 will be given to lend continuity to the present disclosure. Other screening systems may prove to be equally applicable in many instances. The present invention is not to be restricted solely to the preferred screening structure herein described except as set forth in the claims.

The base 42 includes a cylindrical housing 48 on a support structure 50. An access window is provided for inspecting the performance of the unit. A top 54 acts to enclose the separator. A screen replacement access port 56 is provided through the top 54. In some applications, it is desirable to enhance the flow of air into the screen cage and the top 54 can be replaced by a more open structure. The cylindrical shape of the housing 48 lends itself to ease of fabrication and does not specifically add to the efficient operation of the unit. An extension 58 of the cylindrical housing 48 may be employed as a mounting base for the power source (not shown) and for the screen structure 48 through structural members 60 and 62.

Flow from the aeration basin 12 is directed into the centrifugal separator through an inlet pipe 64. The aeration basin flow is directed upwardly against a circular plate 66 which has a depending lip 68. The circular plate 66 in combination with the depending lip 68 causes the aeration basin flow to be redirected onto the distribution means 44. The distribution means 44 includes a primary distributor 70 and a secondary distributor 72. The aeration basin flow may alternately be directed onto the separator through the top. In such an instance, the flow would be directly discharged onto the primary distributor 70. The screen structure 46 may be mounted from above or below in such a configuration. The primary distributor 70 illustrated in the present drawing is more fully disclosed in Talley, U.S. Pat. No. 3,627,130, the disclosure of which is incorporated herein by reference. Any means may be employed which will distribute the aeration basin flow somewhat radially against the screens. It is believed that the primary distributor 70 employed in the present embodiment is one of the most efficient means for accomplishing this intitial distribution. Further, a plurality of these primary distributors 70 may be employed in layered orientation to increase the use of screen area within individual units. Such a plural deck separator is fully disclosed in the Talley, Jr., U.S. Pat. No. 3,707,235, the disclosure of which is incorporated herein by reference.

The primary distributor 70, is incorporated in this embodimment, includes a plurality of inclined plates along which the aeration basin flow will disperse and flow. The outer edges of these plates are angled with respect to the screen structure 46 in order that the aeration basin flow will be distributed against the screen cage in overlapping inclined sheets thereby spreading the aeration basin flow across a greater area of the screen structure 46. The inclined plates also slope along all but the upper edge downwardly and away from the central discharge point. This allows the aeration basin flow to move freely toward the screen structure 46. The primary distributor 70 does not rotate in this configuration; and therefore, the aeration basin flow moves substantially radially outward and slightly downward onto the screen structure 46.

The screen structure, generally designated 46 as illustrated in FIG. 5 provides for the screening of the solids-containing aeration basin flow to remove suspended solid particles therefrom. The screen structure 46 includes a substantially cylindrical screen mounting cage 74 and individual screens 76. The screen mounting cage 74 has a supporting hub 78 to which a top member 80 is attached. A circular rim 82 is fixed about the top member 80 and has a vertical support member 84 depending therefrom. A circular base ring forms the bottom of the screen mounting cage 74. Screens 76 are sized to fit between the circular rim 82 and the base ring 86 between the several vertical supports 84. Guide members 88 are fixed to each of the vertical supports 84 by wing nuts 90. Guide members 88 include locking strips 92 which together with the guide members 88 and vertical support member 84 form channels into which the screen 76 may be positioned and locked in place by the wing nuts 90. The screens 76 are framed by conventional means. The mesh size of the screens 76 to be used in the screen structure 46 depends on the exact use of the screening means in the overall treatment facility. With a fine screen mesh, the amount of wastewater which may be processed per unit of time is less. On the other hand, with coarser screen mesh, more solids are allowed through with the screened effluent. As discussed above, the practicality of the various mesh sizes is highly dependent upon the amount of solids which must be removed from the aeration basin effluent, the type of sludge being processed, the total amount of flow through the system, and the percentage of solids contained within the flow. Tests have been conducted using a mesh size of 400. It is believed that a mesh size of as low as 100 or as high as 635 may be appropriate in some instances while in most cases a mesh size of from 165 to 400 will be found to be preferred. Screens with openings as small as five microns are also available and may prove useful in some instances. However, such fine screens have a relatively small hydraulic capacity per unit area. It is believed that a mesh size range of from 100 to 635 will be found to be most useful. When filamentous organisms are encountered in a system, it may be beneficial to screen the entire effluent from the aeration basin to remove a portion of the solid materials and break up the otherwise spongy consistency thereof. In such an instance, the entire flow from the treatment facility may be passed through one or more screening means 32 having a relatively coarse mesh size. On the other hand, where it is of interest only to reduce the amount of solids flowing to the secondary clarifier 14, a single unit drawing only a portion of the flow through the system may be employed having a fine mesh size for removing a large portion of the solids contained within that portion of effluent directed through the screening means 32.

The screen structure 46 is rotatably mounted to the structural member 60 through bearings 95 (only the lower bearing is shown) on shaft 96. The shaft 96 is driven by conventional means and in turn drives the screen structure 46. The shaft 96 is directly fixed to the supporting hub 78. The screen cage has a sufficient number of screen segments 76 to make a substantially cylindrical structure 46. The speed at which the screen structure 46 is rotated is largely dependent on the diameter of the screen structure 46 and the wear rate of the screens 76.

The wastewater which is processed by the screen structure 46 is divided into a screened effluent and a concentrate. The screened effluent is discharged through the screen structure 46 and is allowed to pass through effluent passageway 34 to the secondary clarifier 14. The concentrate is trapped within the screen structure 46 and must flow downwardly along the inside of the screen structure 46 to be discharged below the base ring 86. A concentrate receiver is formed by a conical receiving plate 97 and a cylindrical wall 98. Pipe 99 provides an outlet for the concentrate receiver. The pipe 99 is associated with the passageway 36 which directs concentrate either to the aeration basin 12 or away from the system through passageway 38. A screened effluent receiver is formed by the cylindrical wall 98, the conical receiving plate 97 and the outer wall of the separator 48. An outlet is provided by pipe 100 which is associated with the effluent passageway 34 to direct screened effluent to the secondary clarifier 14. The cylindrical base ring 86 extends outwardly over the edge of the cylindrical wall 98 to preclude remixing of the screened effluent in the concentrate and to effectively separate the two receivers.

A secondary distributor 72 is provided below the primary distributor 70. This secondary distributor 72 is designed to receive wastewater rebounded from the screen structure 46 and redistribute that wastewater to the rotating screen structure 46 at a lower position thereof. This secondary distributor 72 incorporates a cylindrical body 101 stiuated below the primary distributor 70. This cylindrical body 101 is comprised of three cylindrical sleeves, a lower sleeve 102, a middle sleeve 104 and an upper sleeve 106. The cylindrical body is constructed in this manner to allow nozzles 108 to spray jets of water provided by a manifold 110 at the screen structure 46 for cleaning of the screen structure 46. Vertical plates 112 are radially disposed about the cylindrical body 101 of the secondary distributor 72. These vertical plates 112 receive rebounded wastewater and redirect that wastewater by centrifugal force outwardly at the screen structure 46 for furhter separation. The vertical plates 112 are rigidly fixed to the cylindrical sleeves 102, 104 and 106 of the cylindrical body 101 and extend outwardly to a point near the screen structure 46. Below the vertical plates 112 and adjacent the bottom edge of the lowermost sleeve 102, a base ring 116 may be rigidly fixed to the secondary distributor 72. This base ring 116 insures that all of the wastewater rebounded into the secondary distributor 72 will be redistributed to the screen structure 46. The secondary distributor 72 is mounted to the screen structure 46 by means of brackets 118.

The operation of the screening means 32 as abovedescribed is designed to provide a maximum screening capability and yet allow the concentrate to flow from the screens. To accomplish this advantageous screening action, centrifugal forces are employed through the rotation of the screening structure 46. This allows the wastewater deposited upon the screens 76 to flow by centrifugal action through the screens as effluent. However, it is essential that the screening structure 46 not reach a rotational speed which will cause the solids deposited upon the screens to become bound there by centrifugal force. Rather, the centrifugal force created must be such that the concentrate on the inner sides of the screen structure 46 may slowly flow downwardly into the concentrate receiver. It is believed that a broad rotational speed range developing centrifugal forces of from 1 to 50 g's using the disclosed substantially cylindrical screen structure provides adequate concentrate dryness while allowing the concentrate to flow from the screen structure. The data set out below was obtained with a speed of 350 rpm which is approximately 22.5 g's in the separator used. To further aid the flow of concentrate from the screen structure, a backspray may be provided which is directed at the outside surface of the screens. The screening means 32 as herein described thus provides a continuous screening operation for the treatment of aeration basin flow. Screened effluent is provided which is significantly reduced in solids for distribution to the secondary clarifier. Concentrate is also provided which may be easily collected and returned to the aeration basin or taken from the system. The separator does not remove all of the solids from the screened effluent. However, as previously discussed, screening systems which can provide effluent that may be discharged without secondary clarification have been found to be impractical for wastewater treatment facilities and the like. Consequently, the screening means as herein described provides what is considered to be the best operational screening available for use in the present context. This screening can be employed to reduce the concentration in the secondary clarifier so that it may be run at its hydraulic capacity.

As illustrations of the exceptional capabilities and advantages of the present invention, certain test projects are herein disclosed. In each of these projects, a centrifugal wastewater concentrator having a screen structure diameter of 13 inches and 400 mesh screens was employed. This unit operated only as a testing device. Screen structure diameters of 60 inches are believed to be practical for greater requirements. The screen structure was rotated by a ¾ horsepower motor. The capability of the centrifugal wastewater concentrator was such that the range of rotational speeds of the screen structure was from 0 to 350 rpm. The flow rate could be varied from 0 to 200 gpm and a back spray of from 0 to 160 psi pressure was available.

To determine settling rate under conditions approaching those of the secondary clarifier, a 9 foot long column equipped with a stirring mechanism was used. A stirring speed of 1.0 rpm was used for the reduction of side wall effects on the settling rate.

Figure 6:
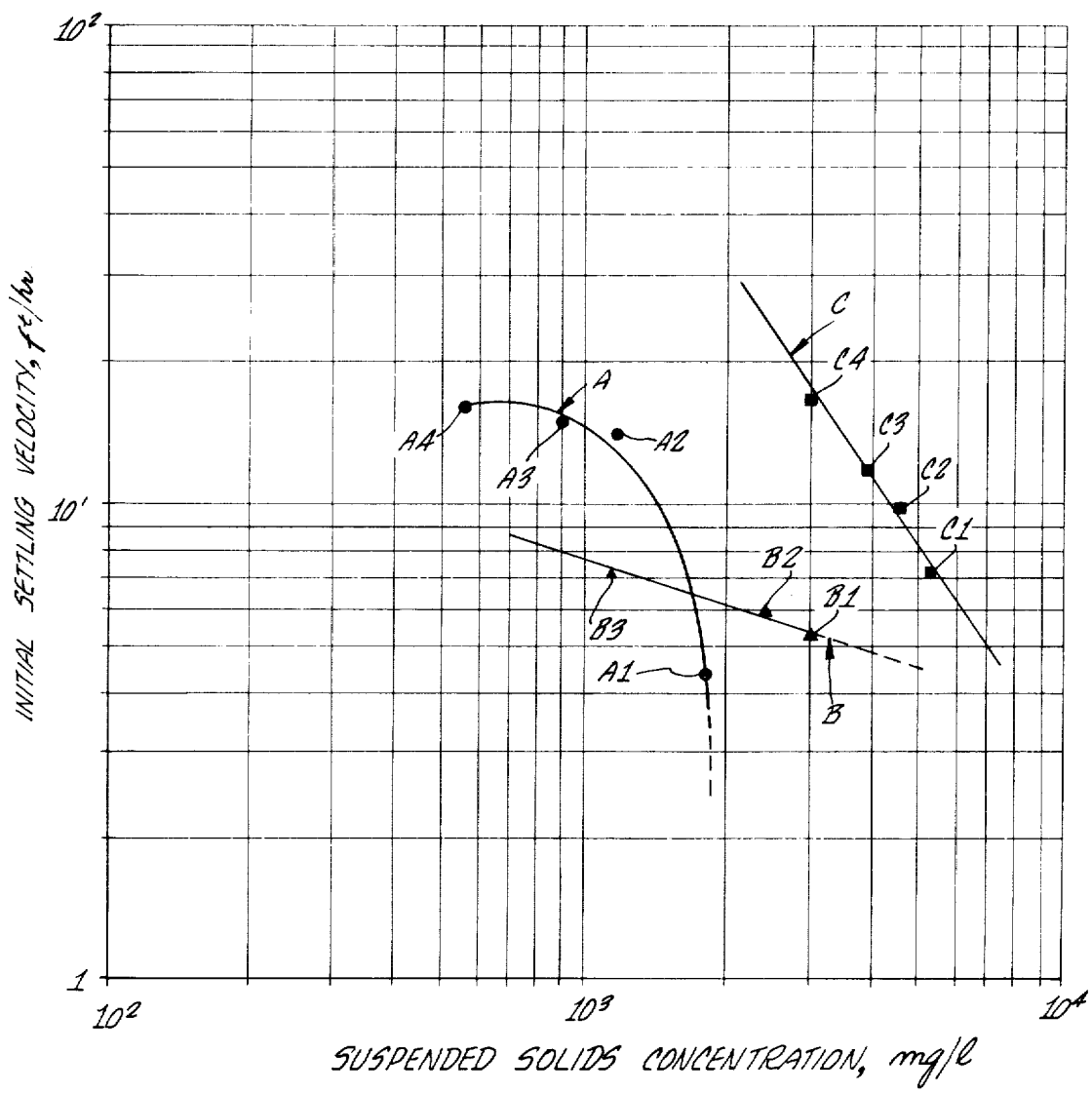
FIG. 6 is a graph illustrating the log of suspended solids concentration in milligrams per liter versus the log of initial settling velocity in feed per hour for four wastewaters.
Figure 7:
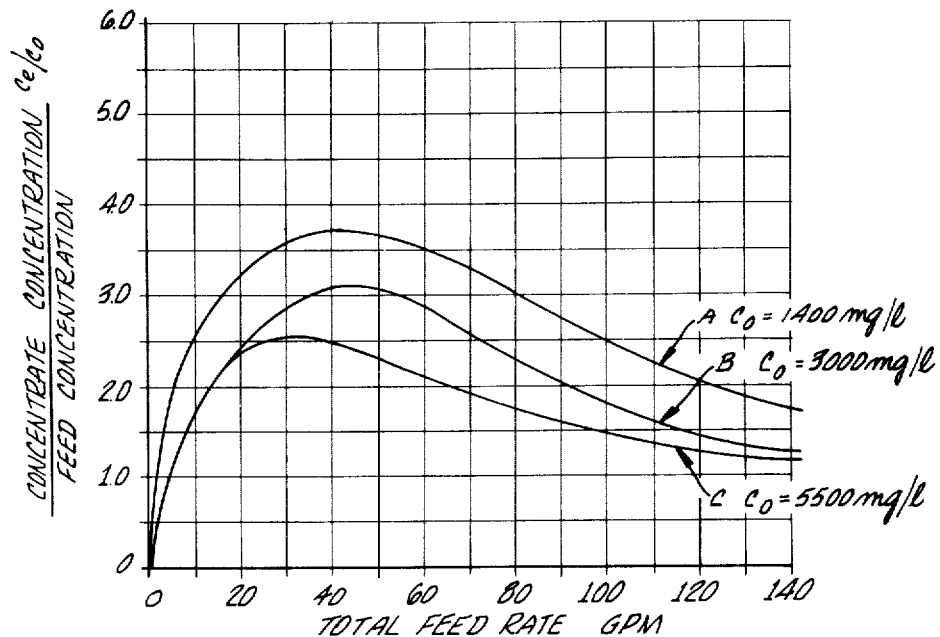
FIG. 7 is a graph illustrating the feed rate to the screening means in gallons per minute versus the ratio of concentration of the concentrate from the screening means to the concentration of the influent to the screening means for four wastewaters.
Figure 8:
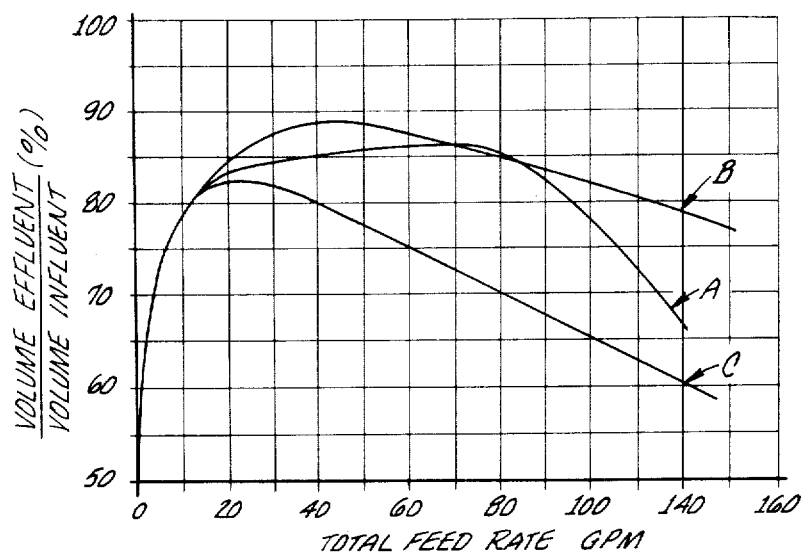
FIG. 8 is a graph illustrating the feed rate to the screening means in gallons per minute versus the ratio of the screened effluent flow to the total influent to the screening means expressed as a percentage for the four wastewaters.

The tests have been divided into three separate examples because three different aeration basin solids were employed. However, all tests were conducted with substantially the same equipment. The results of the three tests are illustrated in FIGS. 6, 7 and 8. FIG. 6 illustrates the settling characteristics of the aeration basin effluent from each facility employed. In FIG. 6, the suspended solids concentration in milligrams per liter is plotted against the initial settling velocity in feet per hour. The scale is logarithmic along each axis. In test A, the aeration basin flow includes a substantial amount of filamentous organisms. Filamentous organisms resist settling when present in substantial concentrations. The material is interlocked and presents a density close to that of water. As can be seen from FIG. 6, the settling rate drops off sharply with an increase in concentration. In test B, the settling rates for the aeration basin flow was considered very good by conventional standards. Test C was run at a facility having no primary sedimentation.

The effectiveness of the concentrator is illustrated in FIGS. 7 and 8 for each of the three tests. In FIG. 7, the total feed rate is plotted versus the ratio of the solids concentration of the concentrate to the solids concentration of the aeration basin effluent. FIG. 7 was prepared using a screen rotation speed of 350 rpm and a stainless steel, market grade, 400 mesh screen. Using the same rotational speed and screens, FIG. 8 was prepared showing the feed rate in gallons per minute versus the percentage of volume of the feed from the aeration basin which becomes screened effluent. The relatively flat curves in the feed rate range of 20 to 100 gallons per minute as illustrated in both FIGS. 7 & 8 illustrate the broad range of useful operation of the screening system. The feed concentrations to the screening means from the various tests varied somewhat. However, the concentrations from the aeration basin may be nominally listed as follows: Test A —

1400 mg/l to 1800 mg/l, Test B — 3000 mg/l, Test C — 5500 mg/l. The range in the ratio of concentrations obtained by the present system as illustrated in FIG. 7 in the useful feed range is from two to four. The range in the volume of screened effluent as a percent of the volume of influent through the same feed range is between 75 and 90 percent as can be seen in FIG. 8.

In combining the effectiveness of the screening system for each of the tests with the settling characteristics of the aeration basin effluents for each of the various tests, the resulting concentration in the effluent to the secondary clarifier in the following tests were as follows: Test A — 550 mg/l, Test B — 1150 mg/l, Test C — 3000 mg/l. These figures indicate what would occur in screening the total aeration basin effluent in each case. In Tests A and B the solids in the effluent were more than cut in half. In Test G, the solids concentration was reduced by over 40 percent. As discussed above, this screened effluent may be mixed with effluent directly from the aeration basin to form an intermediate concentration. From a practical, economic standpoint, it is only necessary to reduce the average concentration of the aeration basin flow to a level which will allow the proper operation of the secondary clarifier already installed in existing plants. In this way, systems which have reached their maximum capability may be revitalized to handle substantially more wastewater. In new facilities, it is believed to be economically advantageous to screen all of the aeration basin flow in order that a smaller secondary clarifier may be installed. FIGS. 9, 10 and 11 illustrate the effects of employing a screening means 32 in each of the test facilities. In each case, the uppermost line represents the facility without any screening. The lowermost line indicates a screening of all of the flow from the aeration basin. Each curve in FIGS. 9, 10 and 11 is plotted on graph of elapsed time in minutes versus the interface height between the settling sludge and the separated liquid in feet as measured from the water line in the stirred column. The curves in FIGS. 9, 10 and 11 are represented by corresponding points in FIG. 6. As can be seen from FIG. 6, the settling rate in the Test A facility went from approximately 4.5 feet per hour to 16 feet per hour when the entire aeration basin flow was screened. This constituted the best increase in settling velocity of the included examples. It is believed that the effect of the presence of substantial amounts of filamentous growth is greatly reduced by the action of the screening device. After processing, the settling rate of the Test A wastewater compared favorably with the other test results where filamentous growth is not present in significant quantities. In Test B, the settling velocity increased over 30 percent. In Test C, the settling velocity increased approximately 138 percent. As settling velocity directly relates to the capability of the secondary clarifier, it can be seen that existing clarifiers may be greatly improved by the presence of such a system as disclosed in the present invention. Further, clarifiers may be smaller than would otherwise be required in a conventional treatment facility.

Thus, a method and apparatus are provided which substantially increases the capabilities of activated sludge treatment facilities and further allow greater control over these processes. While embodiments and applications of this invention have been shown and described, it will be apparent to those skilled in the art that many more modifications are possible without departing from the inventive concepts herein described. The invention, therefore, is not to be restricted except by the spirit of the appended claims.

What is claimed is:
1. An activated sludge wastewater treatment facility employing an aeration basin and a secondary clarifier wherein the improvement comprises:
 screening means constructed and arranged for receiving at least a portion of the flow from the aeration basin for removal of a portion of the solids from the flow received, said screening means dividing the flow received into a screened effluent and a concentrate, said screening means including at least a first screen and distribution means for directing the flow received to at least said first screen with substantial relative movement therebetween, whereby said first screen is maintained in a substantially unclogged condition;
 first passageway means extending from said screening means to the secondary clarifier for directing said screened effluent to the secondary clarifier; and
 second passageway means extending from said screening means to the aeration basin for returning said concentrate to the aeration basin for control of the mean cell residence time within the aeration basin.

2. The facility of claim 1 wherein at least said first screen has a mesh size of from around 100 to 635.

3. The facility of claim 2 wherein said screening means is capable of receiving a sufficient portion of the flow from the aeration basin for removal of solids therefrom to keep the concentration of solids loading to the secondary clarifier below that required for the secondary clarifier to run at hydraulic capacity.

4. The facility of claim 1 wherein said screening means further includes means for rotating at least said first screen to enhance flow therethrough.

5. The facility of claim 1 further including a third passageway means for selectively directing at least a portion of said concentrate from the facility for control of the amount of solids within the facility.

6. The facility of claim 1 wherein said screening means and said second passageway means allow immediate return of said concentrate to the aeration basin to maintain the concentrate in an aerobic state.

7. The facility of claim 1 wherein said screening means further includes a base, a screen structure including a plurality of said screens rotatably mounted on said base, and means for rotating said screens to enhance flow therethrough, said rotation means including a drive for rotating said screen structure, said distribution means being positioned within said screen structure to distribute flow from the aeration basin to the inner side of said screen structure.

8. The facility of claim 7 wherein flow from the aeration basin is distributed by said distribution means to impact said screen structure at a relative velocity with respect to said screen structure when said screen structure is rotating for the breaking of filamentous organisms in the flow received from the aeration basin.

9. An activated sludge wastewater treatment facility employing an aeration basin and a secondary clarifier wherein the improvement comprises:
 screening means constructed and arranged for receiving at least a portion of the flow from the aeration basin for a removal of a portion of the aeration solids from the flow received, said receiving means dividing the flow received into a screened effluent and a concentrate, said screening means including at least a first screen and means for accelerating at least said first screen to enhance flow therethrough;

first passageway means extending from said screening means to the secondary clarifier for directing said screened effluent to the secondary clarifier; and second passageway means extending from said screening means to the aeration basin for returning said concentrate to the aeration basin for control of the mean cell residence time within the aeration basin.

10. The facility of claim 9 wherein said means for accelerating at least said first screen includes a screen structure to which at least said first screen is attached and means for rotatably driving said screen structure to subject at least said first screen to centrifugal force.

11. An activated sludge wastewater treatment facility employing an aeration basin and a secondary clarifier wherein the improvement comprises:

a screening means constructed and arranged for receiving at least a portion of the flow from the aeration basin, said screening means including screens having a mesh size of from around 100 to 635 for dividing the flow received from the aeration basin into a screened effluent and a concentrate, said screening means being capable of handling sufficient flow from the aeration basin such that the average concentration of the total influent to the secondary clarifier may be kept below the maximum desired solids loading of the secondary clarifier, said screening means including distribution means for directing the flow received to said screens with substantial relative movement therebetween, whereby the screens are maintained in a substantially unclogged condition;

first passageway means extending from said screening means to said secondary clarifier for directing said effluent to the secondary clarifier; and second passageway means for selectively directing said concentrate to the aeration basin for control of solids concentration and mean cell residence time within the aeration basin and for selectively directing said concentrate from the facility for control of the amount of solids within the facility.

12. An activated sludge wastewater treatment facility employing an aeration basin and a secondary clarifier wherein the improvement comprises:

screening means constructed and arranged for receiving at least a portion of the flow from the aeration basin, said screening means dividing the flow received from the aeration basin into a screened effluent and a concentrate, said screening means including a base, a screen structure rotatably mounted on said base, distribution means for distributing flow received from said aeration basin to the inner side of said screen structure and means for rotating said screen structure;

first passageway means leading from said screening means to the secondary clarifier for directing screened effluent from said screening means to the secondary clarifier; and second passageway means leading from said screening means to the aeration basin for returning said concentrate to the aeration basin for control of the mean cell residence time within the aeration basin.

13. The facility of claim 12 wherein said screen structure is substantially cylindrical.

14. The facility of claim 12 wherein said means for rotating said screen structure rotates said screen structure to subject the flow received from the aeration basin to a centrifugal loading between around 1 g to 50 g's during screening.

15. An activated sludge wastewater treatment employing an aeration basin and a secondary clarifier wherein the improvement comprises:

a first passageway means leading from the aeration basin;

screening means capable of receiving at least a portion of the flow from the aeration basin through said first passageway means, said screening means dividing the flow received from the aeration basin into a screened effluent and a concentrate, said screening means including a base, a screen structure rotatably mounted on said base, said screen structure including screens having a mesh size of from around 100 to 635, distribution means for distributing flow from the aeration basin to the inner side of said screen structure such that the flow is received at said screens with a substantial relative movement between said screen and the flow received, and means for rotating said screen structure to subject the aeration basin flow to a centrifugal loading of from around 1 to 50 g's during screening;

second passageway means leading from said screening means to the secondary clarifier for directing screened effluent from said screening means to the secondary clarifier; and third passageway means for directing concentrate selectively to the aeration basin for control of the solids concentration within the aeration basin and from the facility for control of the amount of solids within the facility.

16. A method for increasing the capacity of an activated sludge wastewater treatment process, including the steps of:

aerating wastewater in an aeration basin using activated sludge;

directing at least a portion of the flow from the aeration basin to a screening device;

distributing the flow received against screens of the screening device with substantial relative velocity resulting between the screens and the flow directed to the screens such that the screens are maintained in a substantially unclogged condition;

screening the flow received from the aeration basin to reduce the amount of solids contained therein to a level where the entire flow from the aeration basin will have a solids concentration below the maximum solids loading for the secondary clarifier to operate at hydraulic capacity;

directing the screened effluent from the screening device to the secondary clarifier; and directing at least a portion of the concentrate from the screening device back to the aeration basin to control solids concentration and mean cell residence time withiin the aeration basin.

17. The method of claim 16 wherein said concentrate is directed immediately to the aeration basin to prevent conversion of the organisms contained therein to an anaerobic state.

18. The method of claim 16 further including the steps of:

settling the screened effluent and the remainder of the flow from the aeration basin in the secondary clarifier; and returning the settled sludge from the secondary clarifier to the aeration basin.

19. The method of claim 16 further including the step of wasting a portion of the concentrate from the screening device to control the amount of solids within the facility.

20. In an activated sludge wastewater treatment process, the steps of:
   aerating wastewater in an aeration basin using activated sludge;
   directing at least a portion of the flow from the aeration basin and distributing the portion of flow to a screening device;
   rotating the screening device to subject the aeration basin effluent to centrifugal forces during screening;
   screening the portion of flow from the aeration basin to reduce the amount of solids contained therein using screens having a mesh size of from around 100 to 635;
   directing the screened effluent from the screening device to the secondary clarifier; and
   returning at least a portion of the concentrate to the aeration basin.

21. The process of claim 20 wherein the centrifugal forces are from 1 to 50.

22. A method for controlling settling rates in an activated sludge wastewater treatment process experiencing filamentous growth including the steps of:
   aerating wastewater in an aeration basin using activated sludge;
   directing flow from the aeration basin to a screening device when the treatment process experiences filamentous growth;
   distributing the flow received from the aeration basin to screens of the screening device such that substantial relative velocity is achieved between the screens and the flow at the screens whereby the screens are maintained in a substantially unclogged condition;
   screening the flow from the aeration basin to reduce the amount of solids contained therein and to break up the filamentous growth structure;
   directing the screened effluent from the screening device to the secondary clarifier; and
   returning at least a portion of the concentrate to the aeration basin.

* * * * *